June 17, 1947.  H. M. KAUFMAN  2,422,421
SLIDE RULE
Filed June 14, 1946
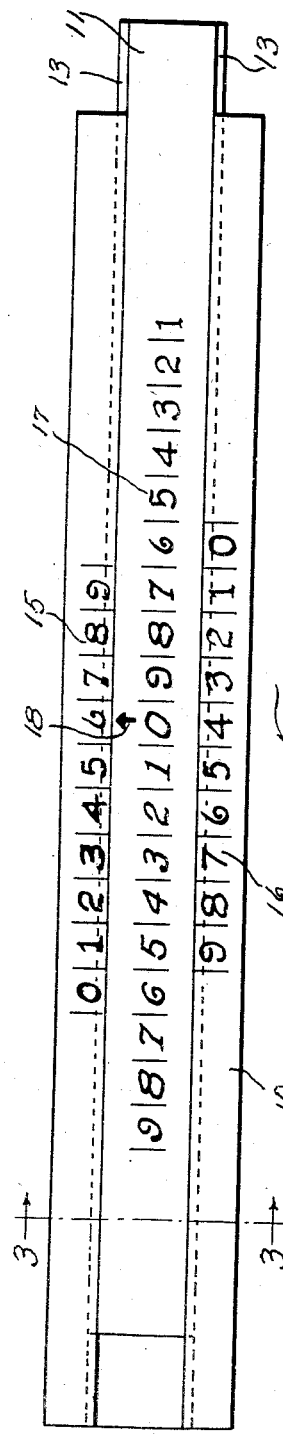
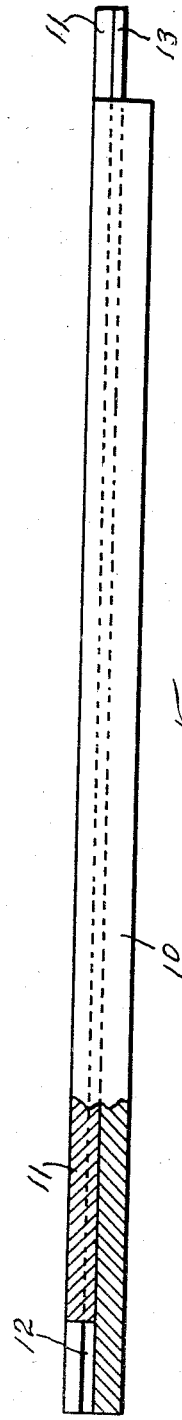
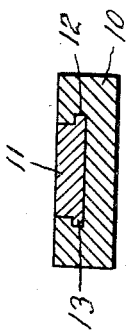
INVENTOR
H. M. Kaufman
BY
ATTORNEY Patented June 17, 1947

2,422,421

UNITED STATES PATENT OFFICE 2,422,421

SLIDE RULE

Hyman M. Kaufman, Amesbury, Mass.

Application June 14, 1946, Serial No. 676,796

2 Claims. (Cl. 235—70)

This invention relates to a slide rule for teaching children addition and subtraction and has for an object to provide a novel and improved device of the above type.

Another object is to provide a device of the above type in which the numbers to be added or subtracted always appear one beneath the other as in the usual addition and substraction problems.

Another object is to provide a device of the above type which is easy for a child to understand and manipulate.

Another object is to provide a slide rule of the above type in which the answer always appears at the same designated position whether adding or subtracting.

Various other objects and advantages will be apparent as the nature of the invention is more fully disclosed.

Although the novel features which are characteristic of this invention are pointed out more particularly in the claims, the invention will be better understood by referring to the following description, taken in connection with the accompanying drawing in which a specific embodiment has been set forth for purpose of illustration.

In the drawing:

Fig. 1 is a plan view of a slide rule embodying my invention;

Fig. 2 is a side elevation thereof; and

Fig. 3 is a transverse section taken on the line 3—3 of Fig. 1.

Referring to the drawings more in detail the device is shown as comprising a base 10 having a channel formed therein containing a slide 11. The base 10 and slide 11 are provided with cooperating grooves 12 and tongues 13 respectively which guide the slide 11.

In the embodiment shown the base carries a pair of scales 15 and 16 and the slide 11 carries a scale 17 which registers therewith. Each scale is divided into a set of equal spaces. The spaces of the scale 15 carry numbers in arithmetical progression from 0 to 9, reading from the left to right. The spaces of the scale 16 carry numbers in arithmetical regression from 9 to 0, reading from left to right. The spaces of the scale 16 are displaced one space to the right from the spaces of the scale 15 so that "1" on the scale 15 appears over the "9" on the scale 16 and vice versa.

The scale 17 is divided into 19 spaces carrying numbers in a double arithmetical regression each extending from 9 to 1 and having a zero interposed between the central 1 and 9. In order to distinguish the two regressions of the scale 17 the left hand regression from 9 to 0 is shown as italicized or slanting whereas the numbers of the right hand regression 9 to 1 are straight. The numbers may be distinguished in other ways if desired as by being of different colors. An answer arrow 18 is positioned on the scale 17 above the "0" to point to a number on the scale 15 which becomes the answer as will be described.

For addition the two numbers to be added are placed one beneath the other by manipulation of the slide and the answer appears above the arrow 18. As shown in Fig. 1 "5" on scale 17 appears below "1" on scale 15 and the answer "6" appears above the arrow 18. Likewise other number combinations which add up to "6" appear one above the other, as "2" and "4," "3" and "3," etc. When a slant number on the scale 17 is added to a number on the scale 15 the answer appears as indicated. When a straight number on the scale 17 is added to a number on the scale 15 the answer number must be mentally increased by ten, as "7" and "9" equal "16." This gives the child practice in carrying the digit as in usual addition problems.

For subtraction the minuend on the scale 17 is brought directly above the subtrahend on the scale 16 by manipulation of the slide 11 and the answer will appear above the arrow 18 as before. In the position shown in Fig. 1 the number "1" on the scale 16 appears below the number "7" on the scale 17. The answer "6" appears above the arrow 18. Likewise other combinations which subtract to "6" appear on the scales 17 and 16, as "9" and "3," "8" and "2," etc. When the minuend is a slant number on the scale 17 it is considered as increased by ten as "8" on scale 16 from "14" on scale 17. In this case also the child is taught the mental borrowing step required in practical subtraction problems.

Obviously all of the numbers on the various scales may be reversed in order, or the numbers on the slide may be reversed in which case the arrow 18 will point to the scale 16. In either case the operation will be the same.

Preferably the numbers on the slide are given a distinctive color, such as red, to distinguish them from the black numbers on the fixed scales. The use of a different color for the numbers of the slide makes the rule simpler for a child to understand than if three numbers all the same color occurred one under the other. The separate color on the slide makes the grouping of two numbers constituting the addends, or two numbers constituting the minuend and subtrahend, easier for the mind to picture and retain.

It will be evident that the child may be drilled with the various addition and subtraction problems as required and the appearance of the numbers to be added or subtracted one above the other gives the child a mental picture of the problem as he will normally encounter the same.

Although a specific embodiment has been shown for purposes of illustration, it is to be understood that variations may be made therein and the invention may be applied to other uses as will readily appear to a person skilled in the art. The invention is only to be limited in accordance with the scope of the following claims.

What is claimed is:

1. A slide rule for addition and subtraction comprising a base member and a slide carried thereby, a pair of scales on said base above and below said slide respectively and a scale on said slide to cooperate therewith, said scales being divided into equal spaces, the spaces of the one of said base scales carrying numbers in arithmetical progression from "0" to "9," the spaces of the other of said base scales carrying numbers in arithmetical regression from "9" to "0" with the "9" on each of said scales registering with the "1" on the other scale, the spaces of said slide scale carrying numbers in a double arithmetical regression from "9" to "0" and "9" to "1" and an index mark on said slide registering with the "0" thereon and with the first mentioned base scale.

2. A slide rule for addition and subtraction comprising a base member and a slide carried thereby, a pair of scales on said base above and below said slide respectively and a scale on said slide to cooperate therewith, said scales being divided into equal spaces, the spaces of the one of said base scales carrying numbers in arithmetical progression from "0" to "9," the spaces of the other of said base scales carrying numbers in arithmetical regression from "9" to "0" with the "9" on each of said scales registering with the "1" on the other scale, the spaces of said slide scale carrying numbers in a double arithmetical series, each series extending from "1" to "9," with a "0" interposed between said series, and an index mark on said slide registering with the "0" thereon and with the base scale in which the numbers progress in a direction opposed to the numbers on said slide.

HYMAN M. KAUFMAN.

REFERENCES CITED

The following references are of record in the file of this patent:

FOREIGN PATENTS

| Number | Country | Date |
|--------|---------|------|
| 1,787  | England | 1904 |

OTHER REFERENCES

Pages 22, 23, 24, and 25 of Arnold's "Special Slide Rules," in September 1933, published by Purdue University. (Copy in Div. 41 of Patent Office.)